March 18, 1947.                J. R. FLECHE                2,417,594
METHOD OF PROGRESSIVELY ELECTRIC RESISTANCE BUTT WELDING
LONGITUDINAL SEAM EDGES OF A TUBULAR BLANK
AND APPARATUS THEREFOR
Filed Feb. 11, 1944            3 Sheets-Sheet 3
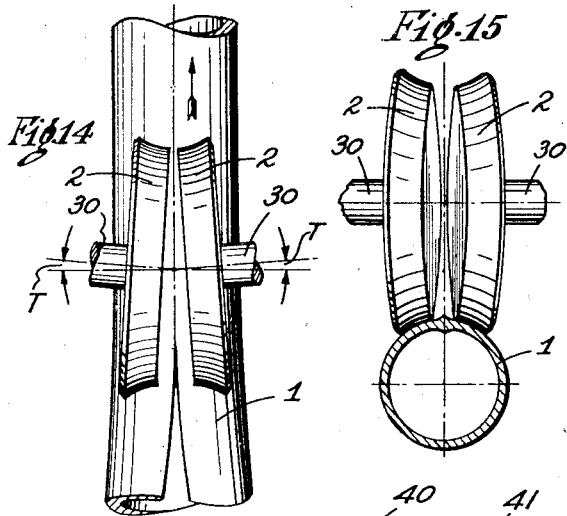
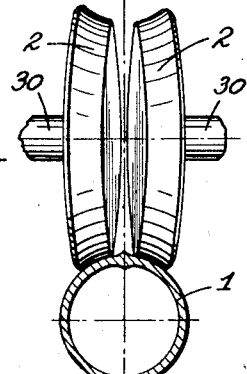
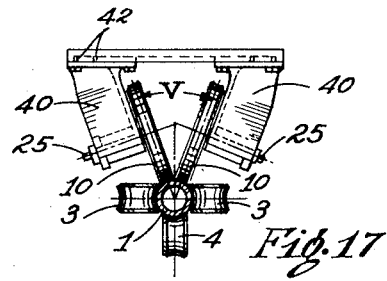
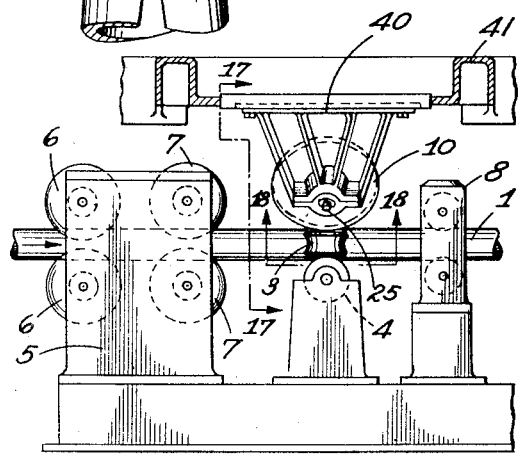
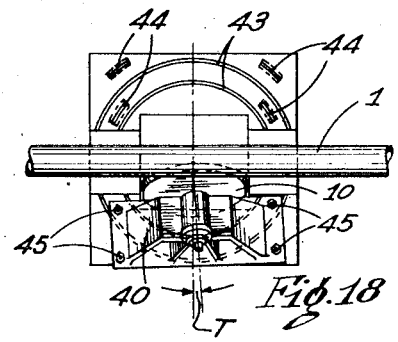
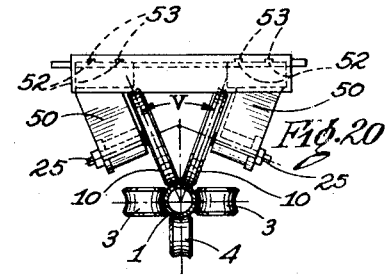
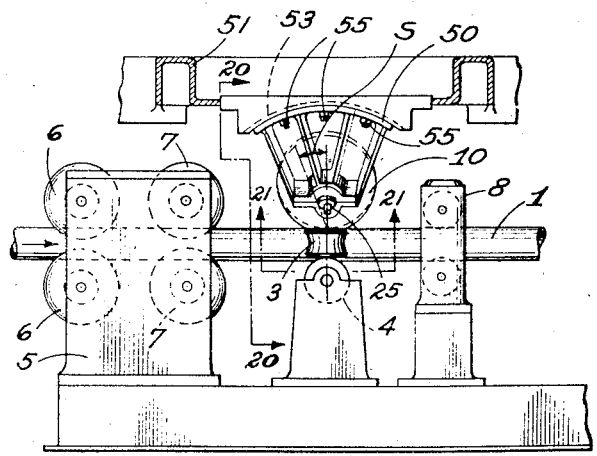
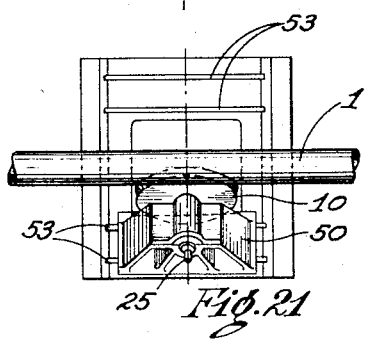
INVENTOR.
JEAN R. FLECHE
BY
Richey Watts
ATTORNEYS Patented Mar. 18, 1947

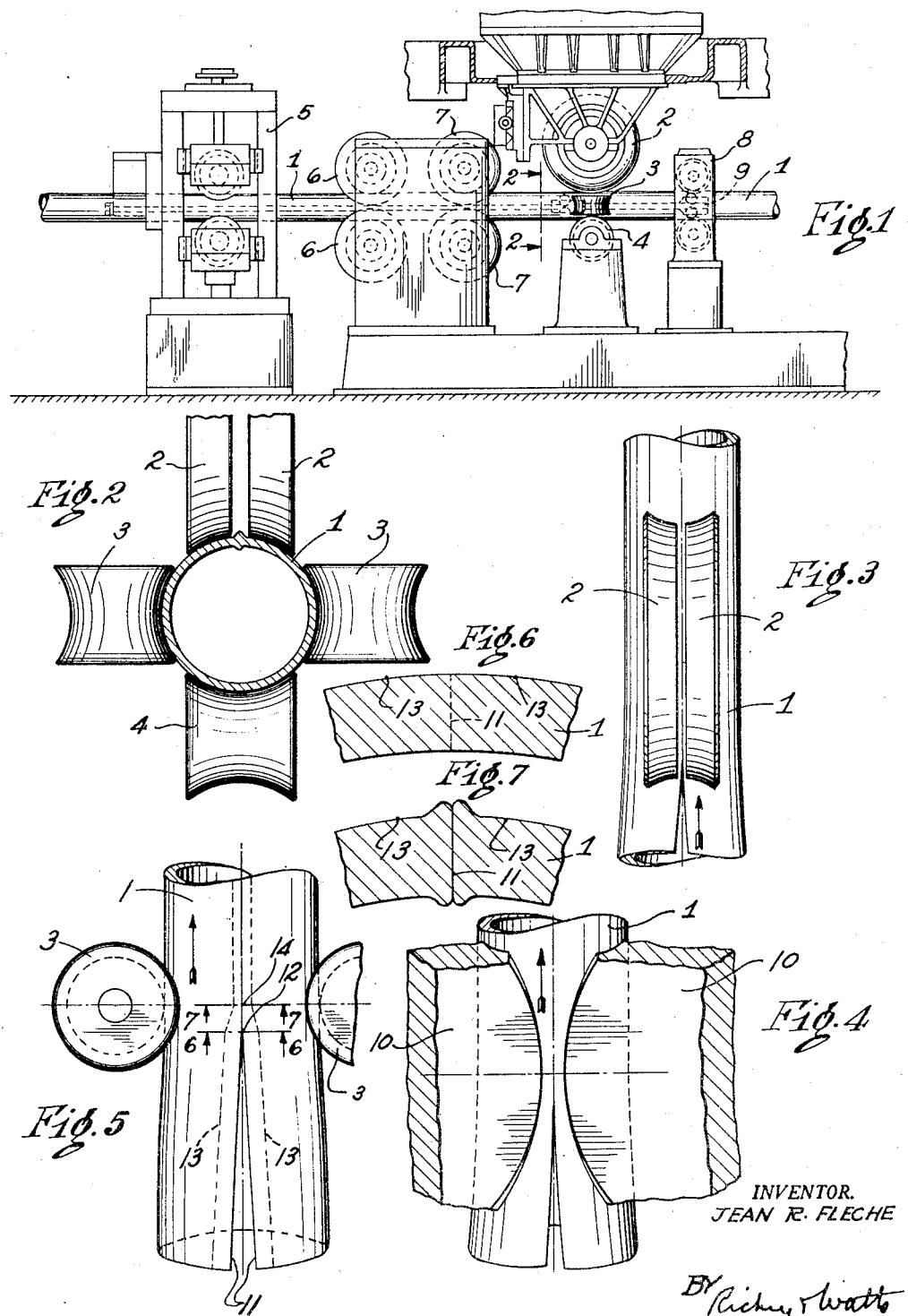

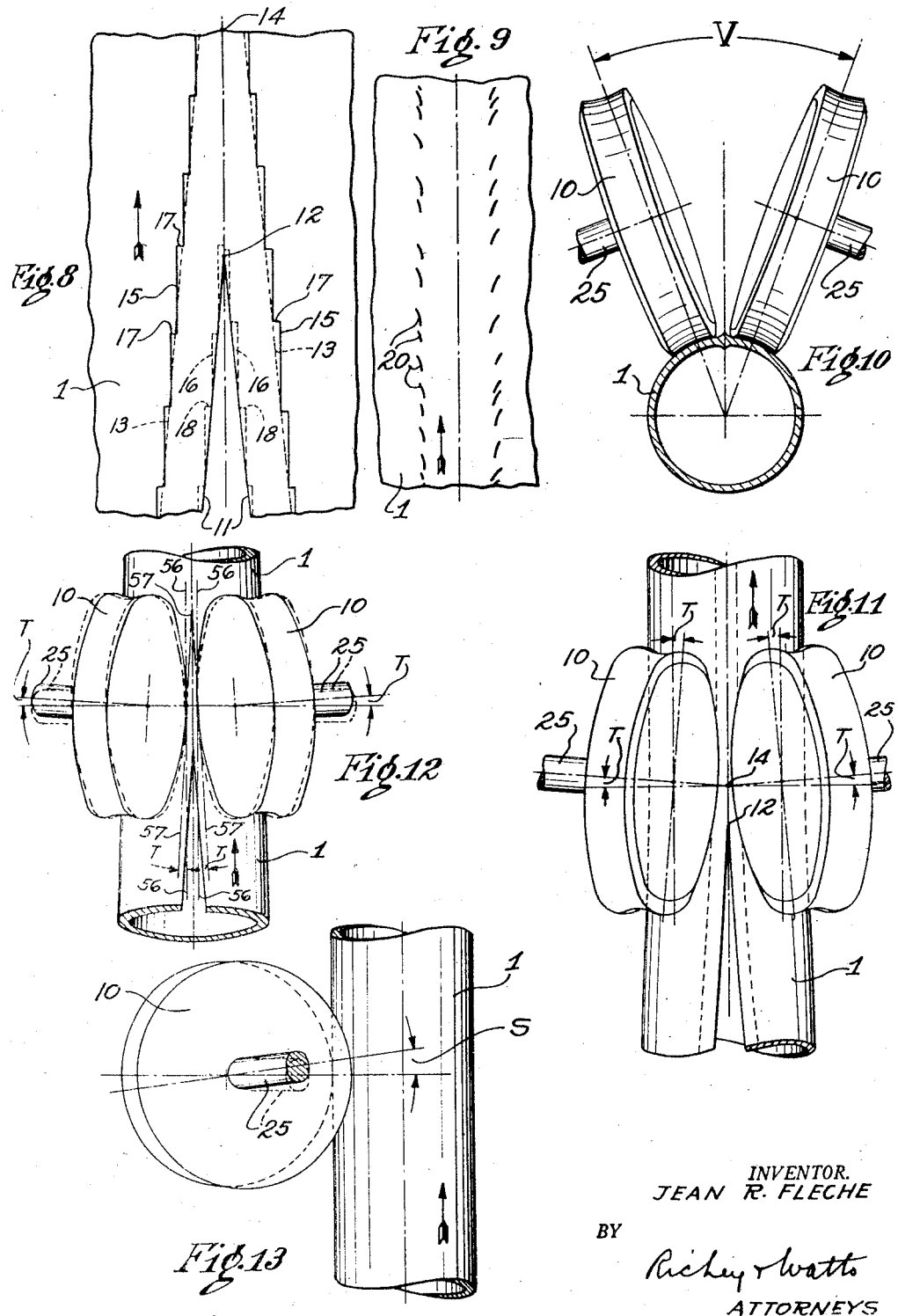

2,417,594

UNITED STATES PATENT OFFICE 2,417,594

METHOD OF PROGRESSIVELY ELECTRIC RESISTANCE BUTT WELDING LONGITUDINAL SEAM EDGES OF A TUBULAR BLANK AND APPARATUS THEREFOR

Jean R. Fleche, Youngstown, Ohio, assignor to Republic Steel Corporation, Cleveland, Ohio, a corporation of New Jersey Application February 11, 1944, Serial No. 521,898

16 Claims. (Cl. 219—6)

This invention relates to the art of electric welding and is particularly concerned with a new and improved apparatus for, and a new and improved method of, resistance butt welding opposed longitudinal edges of tubular metal blanks.

Altho much tubing and pipe has been welded by rotary electrode, resistance butt welders and many improvements have been made in such machines and in the processes practiced by them, troubles are still encountered which are of considerable magnitude. Among these troubles are non-uniformity of the welds, so-called "burns," "surface cracks," copper deposits on surfaces of the blanks which have been traversed by the electrodes and especially around the burns, and instability of the welding operation.

I have discovered that most of, if not all, these troubles occur when there is evidence of unsteady contacts between the electrodes and the blank during welding and that such contacts are, in turn, due to non-uniform lateral slippage of the blank relative to the electrodes.

The present invention makes it possible to avoid these disadvantages more or less completely by minimizing or preventing slippage between the electrodes and blank. Briefly stated, I accomplish these results by so positioning the electrodes relative to the blank that the electrodes will follow the blank more or less closely during its circumferential and longitudinal movement in the welding throat with a minimum of slippage, and preferably without appreciable slippage of the blank laterally with respect to the electrodes. Such positioning may be accomplished by so positioning the electrodes that they "toe in" or engage the tubular blank on lines which converge in the direction of the travel of the blank.

The welds made by rotary electrode, resistance, butt welding machines result from incipient fusion of the seam edge surfaces due to the heating effect of the current and from pressure due to the rolls and electrodes which constitute the welding throat. During welding the diameter of the blank is decreased. The welding throat is defined by the electrodes, two side rolls and, frequently, also one bottom roll. Since the diameter of the throat is less than that of the open seam blank, the seam edges of a blank advancing into that throat are first brought into contact under pressure which increases as the blank approaches the center of the throat. As a result, the blank is reduced in diameter when the seam is closed by engagement of the edges with each other. Then it is still further reduced in diameter to final size especially by the heating and softening of the edge portions and the forcing out or radial extrusion of such metal as upset or flash metal by the increasing pressure. Since the metal of the edge surfaces is displaced radially of the blank, it follows that portions of the blank back of the displaced metal are closer together after such displacement than when the edge surfaces first contacted each other, that is, those back portions have converged in the throat.

In prior, parallel electrode type welders, this convergence of metal back of the edge surfaces was accomplished solely by circumferential movement of the outer surface of the blank relative to the electrodes for the electrodes were parallel, engaged the blank only on parallel lines, and could not engage it on converging lines. Such movement was actually a slippage of the surface of the blank across the faces of the electrodes. This slippage was usually not continuous and uniform, but varied from blank to blank and from area to area on the same blank. For example, when the coefficient of friction between the blank and the electrodes was high, as in the case of hot rolled skelp with sand-blasted, electrode-engaging surfaces, slippage does not occur unless and until the transverse pressure exerted by the throat defining members has been built up to an amount high enough to overcome the friction between the blank and the electrodes. When that pressure has been attained, sudden slippage takes place followed by a decrease of transverse pressure and cessation of slippage. A similar action usually takes place, but to a smaller extent, with prior welders of the angular electrode type, that is, electrodes which are inclined at an angle to each other and which engage the blank on lines substantially parallel to the weld line. As a result, the slippage of a blank on the electrodes was usually not uniform and the slips varied in duration, frequency and rate of speed.

When there is discontinuous slippage, the point where the edge surfaces of the blank first meet, that is, the so-called convergence point, will vary. Immediately after a sudden slip those edge surfaces may engage a certain distance in advance of the transverse center line of the throat. But from that time on and in the absence of all new slippage, the convergence point will move toward the center line of the throat until a new sudden slip brings the convergence point back again a greater distance away from the center line. These fluctuations in the position of the convergence point account for fluctuations in the welding heat, and possible fluctuations in the weld quality.

When such a condition is present the contacts between electrodes and blank are broken or greatly impaired in quality or in area at each successive slippage, with the result that when the current density thru these restricted areas exceeds a certain amount an electric flash may occur between electrodes and blank and the defects may be created which are observed on the outside surface of the blank and known as "burns," occurring generally on each side of the weld and at some uniform distance from it. Burns amount to pits dug out on the blank surface by the intense heat of the electric flash at each sudden slippage, but similar pits may also be produced at the same time on the corresponding electrode surface.

It is not to be inferred from what has just been said that blanks with high coefficients of friction are the only ones which do not slip continuously under the electrodes. For instance, cold rolled stainless steel strip has a glossy surface and hence a lower coefficient of friction than hot rolled skelp with sand blasted edges, and yet it exhibits such a pronounced tendency to burning when made into tubing that it is customarily welded at low speeds, i. e., eight to ten feet per minute, as compared with speeds three to ten times larger for low carbon steel strip. The particular tendency of stainless steel to burning is no doubt traceable to its relative low heat conductivity which prevents dissipation of heat at as high a rate as in carbon steel and thus renders every flash of heat on the surface more dangerous than for carbon steel strip. But every burn can also be connected with each sudden slippage under the electrodes, while fluctuations in the welding heat can also be correlated with discontinuous slippage in just the same manner as for carbon steel skelp or strip and regardless of the lower coefficient of friction.

Depositions of small amounts of electrode copper on the blank, due to sliding contact between the electrodes and the blank, are often observed on the blank within the electrode tracks. But burns on the blank are generally accompanied by heavier copper deposits which I believe are associated with the burning condition. Under the high heat which produces burns, a portion of the electrode surface is apparently melted and transferred to the blank surface. Such copper deposits, whichever their origin, may be responsible for the "checking" or cracking of the welded pipe which sometimes occurs during subsequent hot working or hot bending of the pipe by a customer.

Surface cracks are hair line cracks running parallel and close to the weld line on one or both sides.

By the present invention I am able to avoid, more or less completely, the above described and other attendant disadvantages and short comings of the prior art and to make welded tubing which is substantially free from the above described and other related defects.

In the drawings accompanying and forming a part of this specification,

Fig. 1 is a fragmentary, side elevational view of a conventional welder of the parallel electrode type;

Fig. 2 is a transverse sectional view taken on line 2—2 of Fig. 1;

Fig. 3 is a fragmentary top plan view of the electrodes and part of the blank of Fig. 1;

Fig. 4 is a view similar to Fig. 3 but showing parts of angular electrodes and a blank;

Fig. 5 is a fragmentary, top plan view showing the reduction in diameter and the convergence of the edge portions of a blank in a welding throat;

Figs. 6 and 7 are fragmentary sectional views taken on lines 6—6 and 7—7 of Fig. 5;

Fig. 8 illustrates diagrammatically, and on an enlarged scale, the discontinuous slippage of a blank relative to the electrodes which usually takes place in the welding throat;

Fig. 9 illustrates the appearance on the outside of a welded blank, on the two sides of the weld, of defects known as "burns;"

Figs. 10 and 11 are, respectively, fragmentary end and top views of an arrangement of angular type electrodes embodying the present invention;

Figs. 12 and 13 are, respectively, fragmentary top and side views of another arrangement of angular type electrodes embodying the present invention;

Figs. 14 and 15 are, respectively, fragmentary end and top views of another arrangement of electrodes embodying this invention, including parallel electrodes which toe in.

Fig. 16 is a fragmentary, side elevational view of a conventional welder equipped with angular type electrodes and including means embodying the present invention for positioning the electrodes after the manner shown in Figs. 10 and 11.

Fig. 17 is an end elevational view taken on line 17—17 of Fig. 16;

Fig. 18 is a bottom plan view taken on line 18—18 of Fig. 16;

Fig. 19 is a view corresponding to Fig. 16 but showing different means embodying the present invention for positioning the electrodes after the manner shown in Figs. 12 and 13; and, Figs. 20 and 21 are, respectively, end elevational and bottom plan views taken on lines 20—20 and 21—21, respectively, of Fig. 19.

Fig. 1 shows parts of a conventional welder for welding the longitudinal, opposed seam edges of a tubular metal blank 1, the welding throat being defined by two parallel electrodes 2, side rolls 3 and bottom roll 4, as also shown in Fig. 2. A stand of rolls 5 serves to propel the blank 1 between pairs of rolls 6 and 7 and thru the welding throat. A stand of rolls 8, cooperating with a mandrel 9, serve to roll down the welding "flash" or "bead" on the welded pipe.

As shown in Figs. 2 and 3, the parallel electrodes 2 engage surfaces of the blank on opposite sides of the seam gap or weld.

Fig. 4 shows fragmentarily a part of a conventional welder in which the electrodes 10 are angularly disposed, that is, they are inclined to each other, thereby forming an included angle which may range from as much as 90° and over down to as little as 22° or even less.

Fig. 5 illustrates how the diameter of a blank 1 is decreased in a welding throat of the parallel or angular type welders of Figs. 1 and 4, and also shows the different positions occupied by given portions of the blank as it advances in the throat toward the center line of the electrodes. In this figure the edge surfaces 11 of the blank are some little distance apart when in advance of the welding throat and are brought into actual contact with each other at point 12. The dotted lines 13 represent the positions of portions of the blank which were a given distance back from the edges 11 in advance of the point 12. It will be noted that these lines 13 converge between point 12, where the edges first contact each other, and point 14, which is the point where the weld is completed and is here shown as being located on the center line of the electrodes. Beyond point 14, the lines 13 are again parallel. In effect, the lines 13 trace the movement of portions of the blank some little distance back of the seam edges between places on each side of the transverse center plane of the welding throat and indicate the extent of the circumferential movement of the edges of the blank between points 12 and 14, which is represented by metal along those edges which is extruded or displaced radially during welding.

In Fig. 6, which is taken transversely of the blank at point 12 of Fig. 5, the edge surfaces 11 of the blank are in contact and lines 13 are located some distance back away from those edges. In Fig. 7, which is taken transversely of the blank at point 14 of Fig. 5, the edge surface metal has been upset and extruded radially with the result that the distance between each line 13 and the adjacent welded edge is decreased as compared with the corresponding distance in Fig. 6. By comparing Figs. 5, 6 and 7, it will be seen that the two edges of the blank have moved circumferentially toward each other to the extent of the difference in distance between the two lines 13 of Fig. 6 and the two lines 13 of Fig. 7, this decrease being due to the upset or extruded metal of the edge surfaces. Between the points 12 and 14 of Fig. 5 the distances between lines 13 will vary between the limits shown in Figs. 6 and 7.

Fig. 8 illustrates what I believe actually occurs at times when a blank advances into a welding throat of a conventional welding machine of the types shown in Figs. 1 to 4 and when the operations shown in Figs. 5, 6 and 7 are taking place. In Figs. 8, 11 indicates the edges of blank 1, points 12 and 14 indicate points corresponding to similarly numbered points on Fig. 5, and dotted lines 13 correspond to similarly numbered lines on Fig. 5. However, when the electrodes are parallel as in Figs. 1 to 3 and to a similar but somewhat smaller extent when the electrodes are angular, as in Fig. 4, slippage of the blank relative to the electrodes occurs from time to time and hence neither the edges 11 nor the metal back thereof, as indicated by lines 13, actually follow those lines of Fig. 8. On the contrary, I believe that the actual path of the electrodes on the blank is substantially as is indicated by solid lines 15—17 and that the actual path travelled by the edges 11 is indicated by dotted lines 16—18. I believe that as the blank advances into the welding throat after first engaging with the electrodes it moves forward some distance in non-slipping engagement with the electrodes, as is indicated by lines 15, and that when the lateral pressure exceeds the friction between the electrodes and blank, the edge portions suddenly move circumferentially with consequent slipping represented by steps 17 in lines 15. It must be understood that such slippage is never absolutely instantaneous as assumed by tracing lines 17 at right angle to lines 15; in other words, lines 17 are more or less steep to lines 15, depending on the rate of speed at which slippage takes place; but they are always inclined to lines 15. This operation is or may be repeated until the point of completion of the weld, 14, has been reached. The steps 18 in lines 16—18, which are also more or less steep to lines 16 but have always a slope to said lines 16, illustrate corresponding changes in the movement of the edge surfaces prior to point 12.

I believe that the sudden slippages depicted in Fig. 8 contribute to the production of the defects marked 20 in Fig. 9 and known as burns which are somewhat crescent shaped in plan view, as shown, and of varying sizes and depths. In cross section, under the microscope, they appear as minute pits, as if produced by melting, in the middle of a zone more highly heated than the surrounding metal. I believe that such defects result from the high heat generated at the contact between electrode and blank—when the current required for welding is of great enough intensity—as a consequence of the reduction in contact area at each slippage or as a consequence of an increase in the resistance of said contact as it becomes sliding. It will be noted that these burns 20 occur repeatedly but are not uniform in length or spacing. I attribute this lack of uniformity to a corresponding lack of uniformity of slippage between the blank and the electrodes. It will also be noted that burns sometimes occur only on one side of the weld, which I attribute to the fact that slippage takes place mostly on that side.

I believe that the movement of the edge surface as depicted by lines 16—18 in Fig. 8 explains heat fluctuations in the weld proper, as follows: Sudden circumferential movements along lines 18, on each side, bring the two edge surfaces in contact, as figured near point 12. The convergence point thus obtained will then move in toward point 14, with the blank, until new similar transverse movements along 18 suddenly bring it back to a new similar position near point 12, the exact location depending on the frequency of the successive slips of the edge portions. The convergence point thus moves in and out toward the center line of the welding throat or in the reverse direction. It is a known fact that the area of the convergence point is the hottest spot in the production of the weld, the reason probably being that the contact resistance between the two edge surfaces—which mostly commands the electrical energy spent for heating the edge surfaces, is at a maximum in that area. Most uniform heating would therefore require that this hot spot remain stationary and be traversed continuously and uniformly by every point of each edge surface. On the contrary and when the convergence point moves more or less with the blank, as depicted above, it remains the hot point a longer time than intended and becomes comparatively over-heated until the weld is closed by a new group of slips and a new convergence point is similarly produced and over-heated. As a consequence, areas between such hot points are comparatively under-heated and may even eventually trap some oxide as they are closed suddenly to form the weld. Fluctuation of the convergence point along the weld line relative to the transverse center line of the welder therefore results in fluctuations in the welding heat and eventually in the quality of the weld. Similarly, slippage slower than the average rate is associated with high heat in the weld and faster slippage with low heat in the weld—which similarly account for non-uniform welds.

The foregoing description of Figs. 1 to 9 inclusive is a general resume of the construction and operation of prior welding conventional welders and of some of the troubles presently experienced with them heretofore. The method and apparatus embodying the present invention is described hereinafter.

In Figs. 10 and 11, I indicates a blank in the welding throat of a conventional welder provided with angular electrodes 10 which form an included angle V of about 45 degrees. These electrodes have shafts 25 at right angles to the faces thereof rotating in bearings forming parts of brackets attached to the frame of the welder. It will be noted that the electrodes 10 are "toed in," that is, the center lines of shafts 25 make angles T with a vertical plane perpendicular to the blank 1. These angles T may also be represented by the deviations of the electrodes from lines passing thru the centers of the electrodes and longitudinally of and parallel to the blank. In other words, the shaft 25 of each electrode, instead of being mounted on the same line transverse to the blank, as has been the practice heretofore, makes an angle T with that line and as a result the electrodes engage the blank on lines which converge from the point of first engagement to the point of weld completion. The combination of these V and T angles results in engagement of the electrodes between points 12 and 14 on lines which are nearly, if not quite, parallel to the converging lines 13 of Fig. 5 between those same points.

I have found that the V angle may be varied widely from a few degrees to 90 degrees or more, but that the T angle of each electrode should not exceed about 5 degrees and usually should not exceed about 2 degrees. Apparently the size of the T angle for each electrode is determined by the gage and kind of metal being welded and the diameter of the blank, for I have obtained good results with blanks composed of medium carbon steel which were 2⅜" in outside diameter and had a wall thickness of 0.112" when the included V angle was 90° and the T angle, on each side, was 0.90 degree, and also when the blank was composed of low carbon steel with an outside diameter of 0.700" and a wall thickness of 0.042" and the included V angle was 45° and the T angle on each side was 0.60 degree; and when the blank was composed of 18-8 stainless steel with an outside diameter of 0.700" and a wall thickness of 0.036" and the included V angle was 45 degrees and the T angle on each side was 0.65 degree. In general, it may be said that as the wall thickness increases thereby requiring heavier extrusions, larger T angles are required, but that T angles from about 0.25 to about 5 degrees for each electrode are sufficient in most instances. Since the sum of the T angles between each electrode axis and a transverse plane thru the electrode center and blank is the same as the angle included between the toed in electrodes, the value of the T angles may be expressed on either basis. By "good results" it is meant that the tubing welded under the various conditions just mentioned had a weld which was of quite uniform quality and was free from surface cracks, burns and attendant copper deposits, all as were observed in the prior practice. Also, the welding operation was much more stable as the necessity for making adjustments was much less frequent, as compared with the prior practice.

Figs. 12 and 13 show a modified form of the present invention in which the angular electrodes 10 are not originally toed in as in Figs. 10 and 11, but are mounted in a bracket which is so constructed that the electrodes, their shafts, bearings and holding brackets can be adjusted relative to the welder frame. Fig. 12 shows in dotted lines the angular electrodes in their original positions and engaging the blank along lines 56 which were parallel to the weld line and parallel to each other. Adjustment of the electrode block in the direction shown by the angle S (Fig. 13) results in new positions of the electrodes, as shown in plain lines in Fig. 12, in which they engage the blank along lines 57 which converge and are inclined on the original lines 56 by an angle T on each side. In this way the electrodes can be made to follow more or less closely the converging portions of line 13 of Fig. 5 and slippage between the electrodes and blank is minimized or avoided. In other words, tilting thru the angle S has resulted in toeing the electrodes by the angle T having the same value as before.

Figs. 14 and 15 illustrate a further modification of the present invention. In these figures, the originally parallel electrodes 2 of a welder, for example that shown in Fig. 1, have been toed in with the result that the electrodes tend to trace paths on the blank which converge at a small angle T, on each side, approaching that shown by lines 13 between points 12 and 14 on Fig. 5. The values of these T angles will vary inversely with the diameter of the electrodes for the electrodes should not contact each other or come too close to each other, either during operation or during adjustment of the welder.

One manner of mounting angular electrodes which are to be toed in after the manner shown in Figs. 10 and 11 is shown in Figs. 16, 17 and 18. In these figures each electrode 10 is supported by a bracket 40 in which the shaft 25 of the electrode may rotate. Each bracket 40 is secured to a supporting frame 41. The brackets 40 and frame 41 are provided with interengaging arc shaped tongues 42 and grooves 43, so that the brackets can be rotated relative to the frame and to the direction of welding and the electrodes thereby toed in on the blank by angle T on each side, as shown in Fig. 18. Elongated holes 44 in the fame 41 are provided to receive bolts 45 which pass thru the brackets and serve to fix the brackets in adjusted positions relative to the frame 41. By adjusting brackets 40 on the frame 41 the desired T angle may be obtained for any given blank.

A mounting similar to that of Figs. 16, 17 and 18 could be used to provide an adjustment of electrodes after the manner shown in Figs. 14 and 15. In this case, the shafts 25 would be set horizontal and the V angle would be nil; but the same tongue and groove arrangement 42—43 would permit of adjusting brackets 40 on the frame 41 to the value of T angle required by any given blank.

Another manner of mounting angular electrodes is shown in Figs. 19, 20 and 21. In these figures electrodes 10 have their shafts 25 supported in brackets 50 which have curved upper surfaces to engage with correspondingly curved surfaces on a supporting frame 51. The engaging surfaces of the brackets and frame are provided with tongues 52 and grooves 53. The frame has elongated holes (not shown) in which bolts 55 may be shifted to hold the brackets in fixed position after adjustment relative to the frame 51. By rotating the brackets 50 of Fig. 19 counterclockwise by an angle S as shown, the electrodes may be "toed in" on the blank by an angle T on each side after the manner illustrated in Figs. 12 and 13, as required by any given blank. The apparatus of Figs. 19, 20 and 21 may be used to obtain the adjustment of electrodes in Figs. 12 and 13 if desired.

Having thus described my invention so that others skilled in the art may be able to understand and practice the same, I state that what I desire to secure by Letters Patent is defined in what is claimed.

1. In an electric resistance butt welder a frame, a tube welding throat defined in part by rolls and in part by a pair of rotary electrodes having shafts projecting at right angles therefrom at their centers of rotation, brackets secured to said frame, bearings in said brackets to receive the rotatable shafts of said electrodes, and means operatively associated with said brackets to position the planes of the electrodes at acute angles to the longitudinal axis of a blank in said throat.

2. In an electric resistance butt welder a frame, a tube welding throat defined in part by rolls and in part by a pair of rotary electrodes having shafts projecting at right angles therefrom at their centers of rotation, brackets secured to said frame, bearings in said brackets to receive the rotatable shafts of said electrodes, and means operatively associated with said brackets to vary the angularity of said shafts to a plane at right angles to the longitudinal axis of a blank in said throat.

3. In an electric resistance butt welder a frame, a tube welding throat defined in part by rolls and in part by a pair of angular type rotary electrodes having shafts projecting at right angles therefrom at their centers of rotation, brackets secured to said frame, bearings in said brackets to receive the rotatable shafts of said electrodes and inclined to form a V angle between opposed sides of said electrodes, and means operatively associated with said brackets to vary the angularity of each electrode shaft to a plane thru the center of the electrode and at right angles to the longitudinal axis of a blank in said throat.

4. In an electric resistance butt welder having a frame, a tube welding throat defined in part by rolls and in part by a pair of rotary electrodes having shafts projecting therefrom at their centers of rotation, brackets secured to said fame, bearings in said brackets to receive the rotatable shafts of said electrodes, and means operatively associated with said frame to adjust said brackets relative to said frame and thereby to vary the angularity of the planes of the opposed surfaces of the electrodes to each other and to the longitudinal axis of a blank in the welding throat.

5. In an electric resistance butt welder having a frame, a tube welding throat defined in part by rolls and in part by a pair of angular type rotary electrodes having shafts projecting therefrom at their centers of rotation, brackets secured to said frame, bearings in said brackets to receive the rotatable shafts of said electrodes, and means cooperating with said frame and brackets to adjust said brackets relative to said frame and thereby to vary the angularity of the planes of the opposed surfaces of the electrodes to the longitudinal axis of a blank in the welding throat, without changing the angularity of the electrode planes to each other.

6. In an electric resistance butt welder having a frame, a tube welding throat defined in part by rolls and in part by a pair of rotary electrodes having shafts projecting therefrom at their centers of rotation, brackets secured to said frame and bearings in said brackets to receive the rotatable shafts of said electrodes, each bracket being independently adjustable on the frame to vary the angularity of the shaft in the bracket to a plane at right angles to the longitudinal center line of a blank in the throat.

7. In an electric resistance butt welder, a frame, a tube welding throat defined by rolls and rotary electrodes, shafts projecting from the electrodes at their centers of rotation, brackets having bearings to receive said shafts, cooperating tongues and grooves on said frame and brackets and means for adjustably securing said brackets to said frame with the tongues and grooves in cooperating assembled position so as to vary the angularity of the planes of the electrodes to the longitudinal center line of a blank in said throat.

8. In an electric resistance butt welder having a tube welding throat, a pair of rotary electrodes positioned to engage a tubular metal tube blank in said throat on lines which converge at an included angle of between about 0.5 degrees and about 10 degrees in the direction of travel of said blank.

9. In an electric resistance butt welder having a tube welding throat, a pair of rotary electrodes in said throat, each electrode having a shaft extending at a right angle from the center of one face thereof, and means for positioning said electrodes so that the projection of the axis of each shaft on a plane thru both of the centers of the electrode faces and parallel to the longitudinal axis of the blank in said welding throat makes an angle of between about 0.25 degrees and about 5 degrees with a plane at right angles to the longitudinal axis of a tubular metal blank in said throat.

10. In an electric resistance butt welder having a tube welding throat, a pair of rotary electrodes positioned to engage a tube blank in said throat, each electrode engaging said blank on lines making an angle of between about 0.25 degree and about 5 degrees in the direction of travel of said blank with a plane passing axially thru the blank and equidistant from the opposed faces of said electrodes.

11. In an electric resistance butt welder having a tube welding throat, a pair of rotary electrodes inclined at an angle to each other and positioned to engage an axially moving tube blank in said throat, each of said electrodes having a shaft projecting at right angles from the center of one face thereof, and means for positioning each shaft so that its projection on a plane thru both of the centers of the electrode faces and parallel to the longitudinal axis of a blank in said throat makes an angle of between about 0.25 degree and about 5 degrees with the forward side of a plane at right angles to the longitudinal axis of a blank in said throat.

12. The method of electric resistance butt welding together the longitudinal seam edges of a tubular blank which comprises the steps of passing a weldable metallic tubular blank thru the welding throat of a welder, displacing heated metal of the opposed seam edge surfaces of the blank with coincident convergence of portions of the blank adjacent to said surfaces and welding the blank, and, during passage of the blank thru said throat, engaging the blank with electrodes along lines which converge at approximately the angle of convergence of said portions of the blank.

13. The method of electric resistance butt welding together the longitudinal seam edges of a tubular blank which comprises the steps of passing a weldable metallic tubular blank thru a welding throat of a welder, displacing metal of the opposed seam edge surfaces of the blank with coincident convergence of portions of the blank adjacent to said surfaces and welding the blank and, during passage of the blank thru said throat, engaging the blank with electrodes along lines which converge at an included angle of between about 0.5 degrees and about 10 degrees in the direction of travel of the blank.

14. The method of electric resistance butt welding together the longitudinal seam edges of a tubular blank which comprises the steps of passing a weldable metallic tubular blank thru the welding throat of a welder and welding together the seam edge surfaces of the blank by applying welding heat and pressure to the blank in the throat and, during passage of the blank thru said throat, engaging the blank with electrodes along lines which converge at approximately the angle of convergence of said portions of the blank.

15. The method of welding which comprises the steps of moving endwise a weldable metal tubular blank having an open longitudinal seam gap defined by seam edge surfaces, closing the gap by exerting pressure on the exterior of the moving blank and welding the said surfaces together by engaging the exterior of the blank on opposite sides of said closed seam on lines converging in the direction of travel of the blank with electrodes carrying welding current and by simultaneously applying welding pressure to the exterior of the blank.

16. The method of welding which comprises the steps of moving endwise a weldable metal tubular blank having an open longitudinal seam gap defined by seam edge surfaces closing the gap by exerting pressure on the exterior of the moving blank and welding the said surfaces together by engaging the exterior of the blank on opposite sides of said closed seam and on lines converging at an included angle of between about 0.5 degree and about 10 degrees in the direction of travel of the blank with electrodes carrying welding current and by simultaneously applying welding pressure to the exterior of the blank.

JEAN R. FLECHE.

REFERENCES CITED

The following references are of record in the file of this patent:

UNITED STATES PATENTS

| Number | Name | Date |
|---|---|---|
| 747,841 | Baehr | Dec. 22, 1903 |
| 1,999,805 | Dyer | Apr. 30, 1935 |
| 1,434,885 | Gale | Nov. 7, 1922 |
| 1,623,249 | Kahn | Apr. 5, 1927 |
| 658,741 | Parpart | Sept. 25, 1900 |
| 1,119,079 | Heinsohn | Dec. 1, 1914 |
| 1,583,214 | Williams | May 4, 1926 |